United States Patent
Gresley

(10) Patent No.: US 8,267,821 B2
(45) Date of Patent: Sep. 18, 2012

(54) MECHANICAL TENSIONER WITH DAMPING MECHANISM

(75) Inventor: Ross Gresley, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 147 days.

(21) Appl. No.: 12/789,630

(22) Filed: May 28, 2010

(65) Prior Publication Data

US 2011/0015015 A1    Jan. 20, 2011

Related U.S. Application Data

(60) Provisional application No. 61/225,585, filed on Jul. 15, 2009.

(51) Int. Cl.
*F16H 7/12* (2006.01)
(52) U.S. Cl. ........................................ 474/133
(58) Field of Classification Search .................. 474/133; 384/276, 275
See application file for complete search history.

(56) References Cited

U.S. PATENT DOCUMENTS

| | | | | |
|---|---|---|---|---|
| 4,494,883 A | * | 1/1985 | Winter | 384/439 |
| 4,878,652 A | * | 11/1989 | Wordin | 251/181 |
| 5,044,606 A | | 9/1991 | Wordin | |
| 5,601,276 A | * | 2/1997 | Wordin | 251/214 |
| 5,695,199 A | * | 12/1997 | Rao et al. | 277/455 |
| 6,484,999 B1 | | 11/2002 | Wordin et al. | |
| 6,651,957 B2 | * | 11/2003 | Wordin et al. | 251/312 |
| 7,731,428 B2 | * | 6/2010 | Kuan | 384/545 |
| 7,850,561 B2 | * | 12/2010 | Wilhelm et al. | 474/135 |
| 7,887,445 B2 | * | 2/2011 | Quintus et al. | 474/135 |
| 2005/0181902 A1 | * | 8/2005 | Konanz | 474/135 |
| 2007/0183702 A1 | * | 8/2007 | Gresley | 384/477 |
| 2009/0075768 A1 | * | 3/2009 | D'Silva et al. | 474/135 |
| 2011/0118071 A1 | * | 5/2011 | De Maziere | 475/114 |

* cited by examiner

*Primary Examiner* — Michael Mansen
*Assistant Examiner* — Mark K Buse
(74) *Attorney, Agent, or Firm* — Volpe and Koenig, P.C.

(57) ABSTRACT

A mechanical tensioner that includes a pulley arm with a tension pulley for a tension element drive of an internal combustion engine. The pulley arm is mounted to a mounting base that is fixedly attached to the engine. A spring that functions in compression and torsion is located about a pivot axis on the mounting base, with one end connected to the pulley arm and the other end attached to the mounting base. The spring provides torsion to the pulley arm to maintain tension on the tension element, and is also compressed between a mounting flange of the pulley arm and a support flange on the mounting base to transmit an axial force between the pulley arm and an outer hub that is fixed to the mounting base. A shaped bush which functions at least as a damping element, and can also function as a bearing, is located in the space between the outer hub and the pulley arm. The outer surface of the outer hub, the bush and the inner portion of the pulley arm are in the shape of a tractrix pseudosphere to provide increased life and reduced wear.

9 Claims, 5 Drawing Sheets

$$X = A\left[\cosh^{-1}(A/Y)\right] - \sqrt{(A^2 - Y^2)}$$

MECHANICAL TENSIONER WITH DAMPING MECHANISM

CROSS-REFERENCE TO RELATED APPLICATIONS

This application claims the benefit of U.S. Provisional Application No. 61/225,585, filed Jul. 15, 2009, which is incorporated herein by reference as if fully set forth.

BACKGROUND

The present invention relates to a friction damped mechanical tensioning device for belt or chain drives, commonly referred to tension element drives, which are commonly used on internal combustion engines.

Mechanical tensioners are used to automatically control the tension of a tension element, such as a belt or chain, on the accessory drive typically located at the front of internal combustion engines used in automobiles as well as other motor driven equipment. Known tensioners, such as shown in FIGS. 2A-2E, typically include a pivoting arm having a tension pulley located at its distal end. The arm is rotatable about a pivot axis provided by a mounting base, and is biased via a torsion spring, usually mounted about the pivot axis, with one end connected to the pivot arm and the other end attached to the base to bias the tension pulley located on the arm against a tension element drive. In many known arrangements, such as shown in FIGS. 2B-2E, the spring generates an additional axial force so that a portion of the pivot arm adjacent to the pivot axis is pressed against a damping element to control oscillatory movements of the pivot arm.

As shown in FIGS. 2A-2E, in the prior art devices, the tension pulley is generally offset in relation to the pivot bushing or bearing which rotatably supports the pivot arm, and this bushing or bearing must carry offset loads due to the moment generated by the offset between the tension pulley and the bushing or bearing arrangement in the mounting base. This results in uneven or excessive wear of the bushing along with the attendant pulling of the pivot arm out of its desired alignment. Further, this compromises the damping ability of the tensioner based on uneven wear, particularly with disk-type damping elements which wear unevenly in the radial direction. Cone dampers also wear unevenly in the radial direction, and damping shoes require a more complex design due to uneven bushing wear.

SUMMARY

To address these issues, a tensioning arrangement is provided that ensures a nearly constant tensioning and asymmetrical friction dampening over an expected life of the mechanical tensioner or according to the invention, with a limited degree of wear. The asymmetrical damping provides a higher level of the attenuation of the oscillatory and fluctuating loads from the tension element, such as a drive belt or chain. Additionally, based on the invention, a tensioner having a reduced number of parts which reduces costs and assembly time is provided.

The tensioner according to the invention includes a pulley arm with a tension pulley for a tension element drive of an internal combustion engine. The pulley arm is mounted to a mounting base that is fixedly attached to the engine. A spring that functions in compression and torsion is located about a pivot axis on the mounting base, with one end connected to the pulley arm and the other end attached to the mounting base. The spring provides torsion to the pulley arm to maintain tension on the tension element, and is also compressed between a mounting flange of the pulley arm and a support flange on the mounting base to transmit an axial force between the pulley arm and an outer hub that is fixed to the mounting base. A shaped bush which functions as both a bearing and damping element is located in the space between the outer hub and the pulley arm. The configuration of the outer surface of the outer hub, the bush and the inner portion of the pulley arm is in the shape of a tractrix pseudosphere. This provides uniform wear and results in longer life of the unit compared to the disk, cone or shoe dampers in the known prior art mechanical tensioners which wear in an uneven manner.

In one embodiment of the invention, the bush may have a number of grooves on its surface to allow abraded material to escape and maintain the design bush shape and friction properties.

Preferably, the bush is made of a polymer or metallic material.

In the preferred embodiment, the tractrix curve which defines the tractrix pseudosphere provides an even and uniform distribution of pressure over an entire surface of the bush. This results in wear that occurs from friction between the main components being proportional to a unit area work done when the tension pulley arm is rotated. Accordingly, the mechanical tensioner of the invention "wears in" during use, rather than wearing out.

According to the invention, preferably the tension pulley and bush are located generally in a common plane extending perpendicular to an axis of the mounting base and bush. This is preferably accomplished by providing a substantially larger bearing and damping surface than is possible with the known prior art arrangements.

Further, preferably a bush rotator for one-way rotation of the bush is provided to allow for more even wear and asymmetric properties.

BRIEF DESCRIPTION OF THE DRAWING(S)

The foregoing summary, as well as the following detailed description of the preferred embodiment of the present invention will be better understood when read in conjunction with the appended drawings. For the purposes of illustrating the invention, there is shown in the drawings an embodiment which is currently preferred. It should be understood, however, that the invention is not limited to the precise arrangement shown.

DETAILED DESCRIPTION OF THE PREFERRED EMBODIMENT(S)

Figure 1:
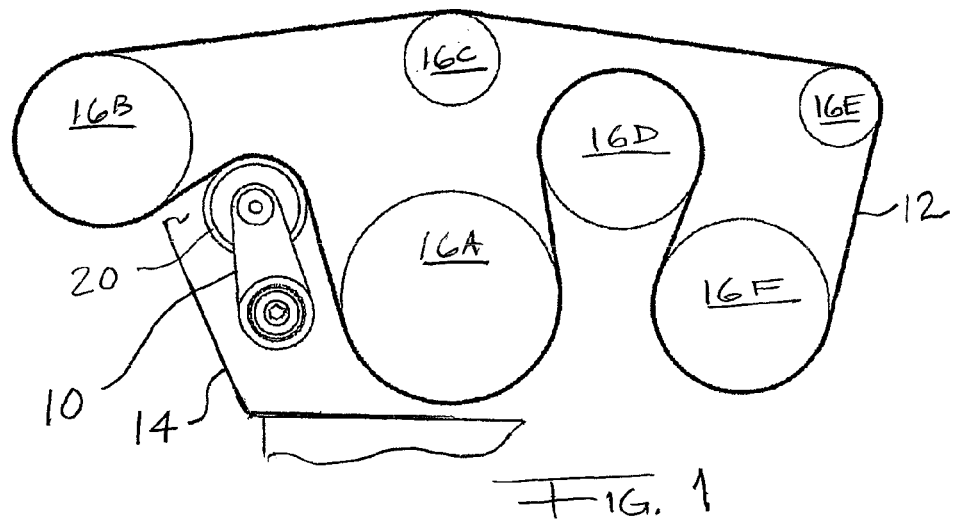
FIG. 1 is a schematic front view showing a tension element drive with a tensioner according to the invention mounted on the front of an internal combustion engine.
Figure 2A:
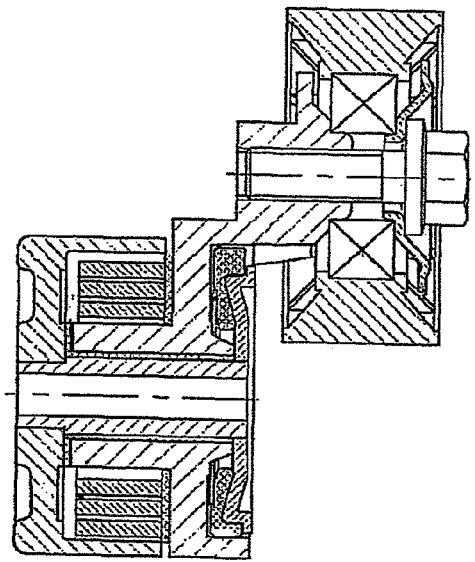
FIGS. 2A-2E show cross-sectional views through known prior art belt tensioners.
Figure 2B:
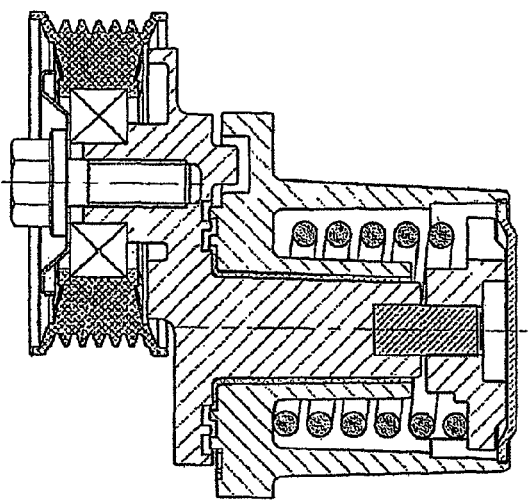
Figure 2C:
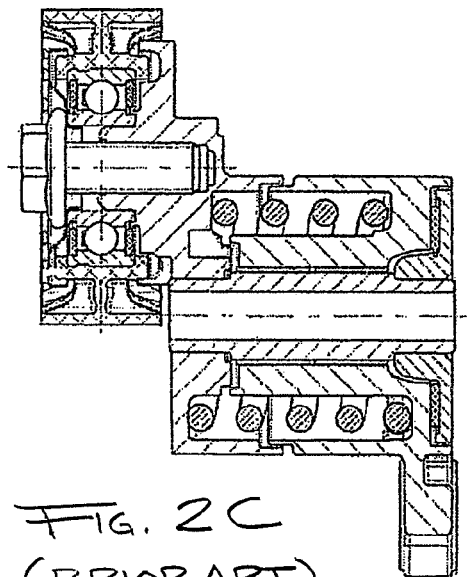
Figure 2D:
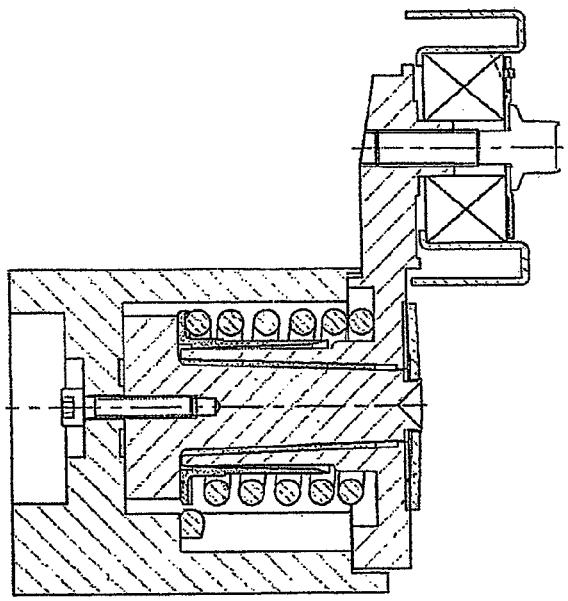
Figure 2E:
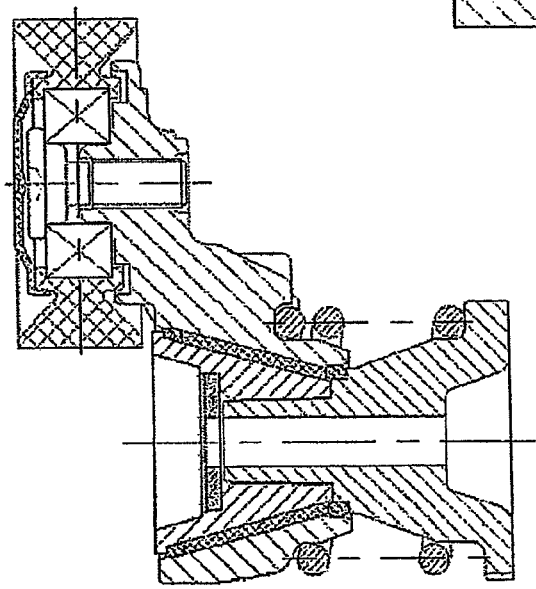

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the mechanical tensioner shown and designated parts thereof. The terminology includes the words above specifically mentioned, derivatives thereof and words of similar import.

Referring to FIG. 1, a tension element drive in which a mechanical tensioner 10 is utilized in shown. The tension element 12 is preferably a belt or chain used in connection with an accessory drive located on the front of an internal combustion engine, represented schematically at 14. The tension element 12 is mounted around a plurality of pulleys 16A-16F, which can include for example, a drive pulley 16A, an alternator pulley 16B, a camshaft pulley 16C, a water pump pulley 16D, air conditioning pulley 16E and idler pulley 16F. The mechanical tensioner 10 includes a tension pulley 20 which is used to apply tension to the tension element 12 in order to take up slack, reduce vibration generated by the engine and the various accessory drives as well as to prevent slippage of the tension element which can be for example, a timing belt.

Figure 4:
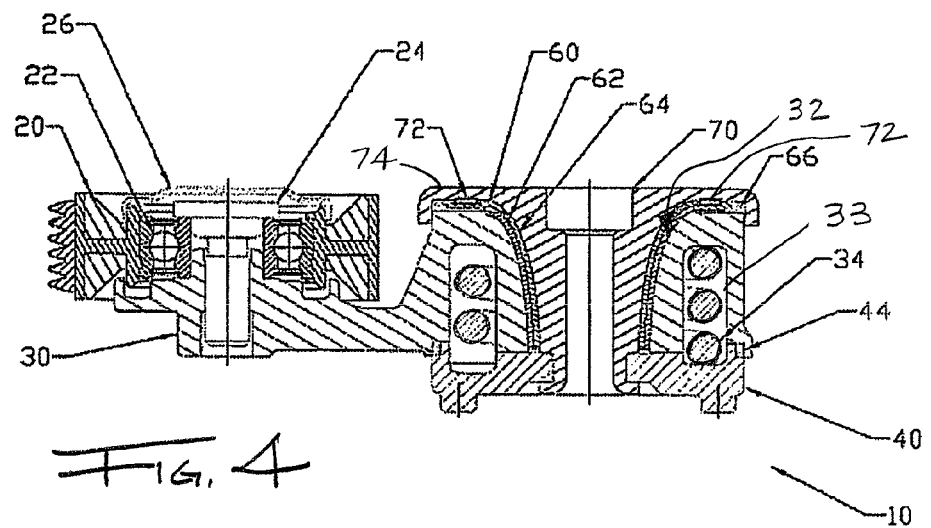
FIG. 4 is a cross-sectional view through the mechanical tensioner of FIG. 3 taken along line 4-4 in FIG. 3.
Figure 3:
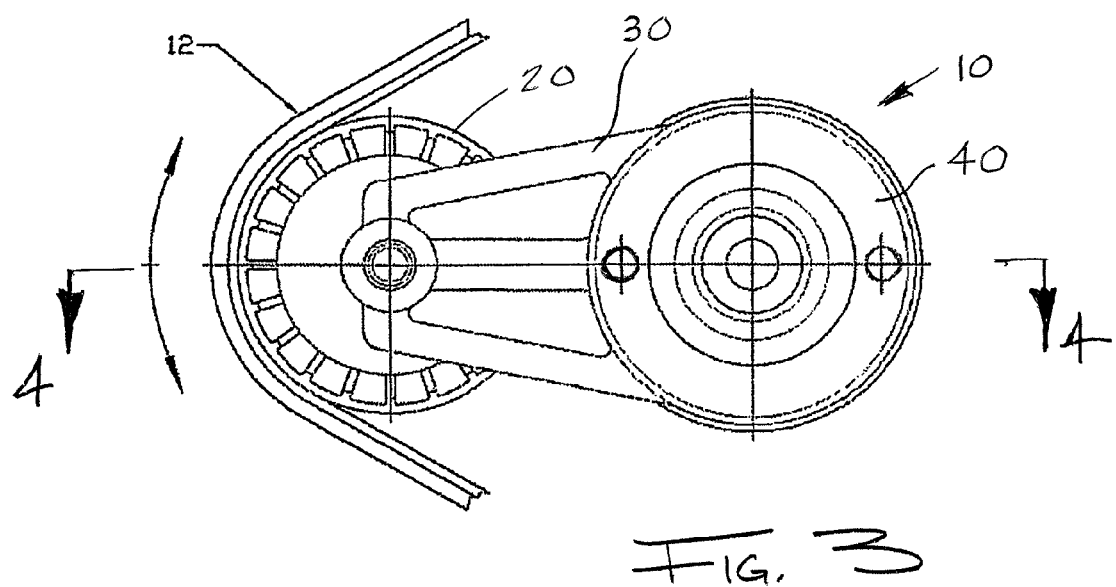
FIG. 3 is a view of a mechanical tensioner according to a first embodiment of the present invention.

Referring to FIGS. 3 and 4, a first embodiment of the mechanical tensioner 10 is shown in detail. The tensioner includes a pivotable pulley arm 30 upon which the tension pulley 20 is rotatably mounted. Preferably, the tension pulley 20 is supported by a bearing 22, which can be a ball bearing, which is fixedly mounted to the pulley arm 30 by a stepped bolt or shaft 24. A cover 26 closes the pulley assembly to prevent dirt or debris from entering into the bearing 22.

Figure 7:
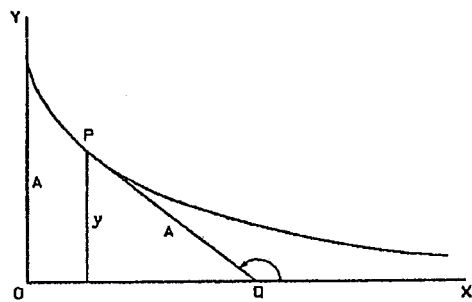
FIG. 7 is a graph and formula showing the derivation of a tractrix curve which defines the bush used in connection with the mechanical tensioner according to the invention.
Figure 8:
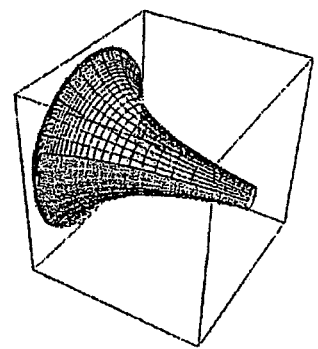
FIG. 8 is a three dimensional view of a tractrix pseudosphere defined by the curve of FIG. 7 when rotated about the asymptote X axis that defines a surface of the bush used in connection with the mechanical tensioner of the present invention.

The pivoting pulley arm 30 is pivotably mounted to a mounting base 40. The pivot arm 30 has a bore 32 at the proximal end that is in the shape of a tractrix pseudosphere, as shown in FIGS. 7 and 8, with the tractrix curve being specifically of the type shown and defined by the formula in FIG. 7 in which any tangent section from a tangent point on the curve to the curve's asymptote has a constant length. The tractrix curve rotated about the asymptote forms the tractrix pseudosphere which has a surface of constant negative curvature, as shown in FIG. 8. The pulley arm 30 is held in place via an outer hub 70 that is fixed to the mounting base 40. The outer hub 70 has a complementary surface to the bore in the pulley arm 30, that is in the shape of a tractrix pseudosphere. A bush 60 is contained intimately within the annular space between the outer surface of the outer hub 70 and the inner surface of the bore 32 in the pulley arm 30. The bush 60 is preferably made of a polymeric or sintered bearing material and provides both damping and bearing functions. Surface portion 62 and surface portion 64 of the bush 60 are inner and outer frictional materials of the bush 60 used for asymmetric damping.

A bush rotator 72 for one-way bush rotation and for balancing radial wear is positioned at the outer periphery of the bush 60, on the underside of the flange 74 of the outer hub 70. The bush rotator 72 which can be for example a leaf or wedge-shaped member having a smooth or ramped contact surface in one direction and sharp edge in the other direction to only allow one-way rotation. This can also be provided by contact surfaces with axially extending projections which have a variety of shapes on the flange of the bush and/or the flange of the outer hub that allow one-way rotation of the bush.

The pulley arm 30 has an annular cavity 33 at the proximal end to contain a spring 34, which is preferably a torsion spring which works in both torsion and compression. The spring 34 acts against the mounting base 40 and is preferably fixed there at one end and is connected at the other end to the arm 30 in order to apply a torsion load on the arm 30. The spring 34 also acts in compression against the inside of the cavity 33 in order to press the arm 30 axially outwardly against the bush 60 and the mating surface of the outer hub 70.

Preferably a seal 66 is located between an outer rim of the flange 74 of the outer hub 70 that overlaps the periphery of the arm 30 in the mounting area in order to protect the bush 60 and the bearing/friction surfaces from dirt and debris. A further seal 44 is located between the pivot arm 30 and the base 40 in order to protect the spring portion of the belt tensioner. The seals can be contact seals made of a flexible polymeric material, or can be non-contact labyrinth seals.

In use, the tensioner 10 is installed as shown in FIG. 1, with a bolt extending through the opening in the outer hub 70 along the pivot axis to clamp the tensioner to the engine block, and applies tension via the torsion spring 34 acting on the arm 30 to press the tension pulley against the tension element 12. Further, the friction/damping properties of the bush 60 act to damp oscillatory motions of the arm 30 in the directions of the arrow shown in FIG. 3.

As a result of the bush 60 having a tractrix pseudosphere form, it acts as a bearing and damper without experiencing unequal or uneven wear loads while maintaining consistent damping and/or bearing characteristics. The bearing and damping characteristics can be adjusted by the materials used to form the bush 60 and/or by inner or outer bearing or friction materials 62, 64 applied to the bush 60. Further, the asymmetrical damping feature is a function of the difference in the frictional forces of the two bush surfaces required to control the loads in the opposing directions of the oscillatory motion of the pulley arm. When the pulley arm moves in a belt tightening direction, a force n is realized, and when the pulley arm moves in the slackening direction, a larger force n+x is realized. The specific design of the bearing and damping properties can be adjusted as needed using these factors based on the design requirements.

Additionally, the pulley 20 and bush 60 are generally aligned in a radial plane extending perpendicular to an axis of the bush 60. This helps to eliminate eccentric loads and moments which are a further cause of uneven wear. Further, by providing the bush 60 with opposing surfaces with different coefficients of friction, it is possible to address and attenuate specific oscillatory and fluctuating loads of the tension element 12. Finally, by providing for one-way rotation of the bush via the bush rotator 72 more even wear results.

Figure 6:
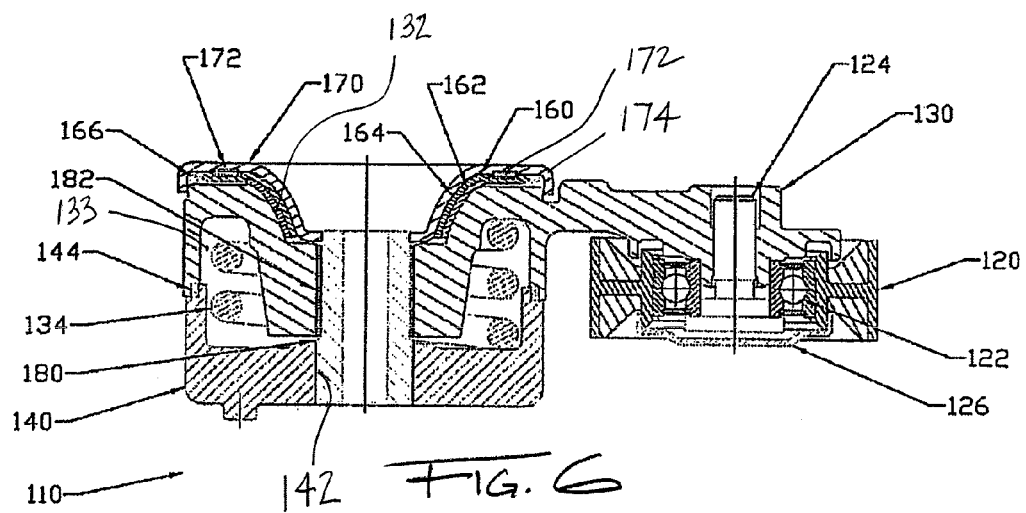
FIG. 6 is a cross-sectional view through the mechanical tensioner of FIG. 5 taken along line 6-6 of FIG. 5.
Figure 5:
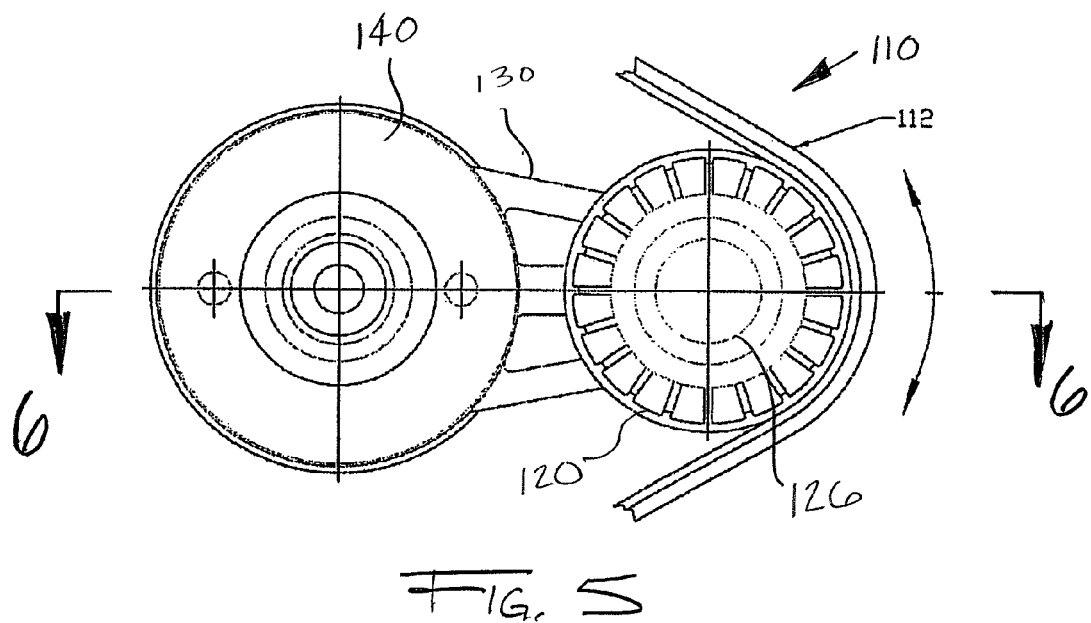
FIG. 5 is a view of a mechanical tensioner according to a second embodiment of the present invention.

Referring to FIGS. 5 and 6, a second embodiment of the mechanical tensioner 110 is shown. The tensioner 110 includes a pivot arm 130 having a tension pulley 120 located at the distal end and is connected at the proximal end to a mounting base 140. The tension pulley 120 is preferably mounted by a ball bearing 22 that is fixed in position via a stepped bolt or shaft 124. A cover 126 closes the pulley assembly.

The mounting base 140 has a bore 142 in which a pivot tube 180 is fixedly attached. The outer hub 170 is attached to the opposite end of the pivot tube 180. The mounting end of the pivot arm 130 has a shaped bore 132 and is rotatably mounted about the pivot tube 180. A bush 182 is located between the outer surface of the pivot tube 180 and the inner surface of the bore 132 in the pivot arm 130. This acts as the bearing assembly for pivoting the pivot arm 130 about the mounting base 140.

A damper bush 160 is located in an annular space between an outer surface of the outer hub 170 and an inner surface of the bore 132 of the pivot arm 130 to apply a damping force to control oscillatory movements of the pivot arm 130. The outer surface of the outer hub 170, the damper bush 160 and the corresponding area of the inner surface of the bore 132 all have a tractrix pseudosphere form. The bush 160 includes inner and outer surfaces 162, 164 that include different inner and outer friction materials for asymmetric damping. A bush rotator 172, similar to 72 above, is located on the outer hub 170 under the flange 174 to allow one-way rotation of the bush 160. The bush rotator 172 can be for example a leaf, barb or other toothed-shape allowing rotation in one direction while preventing rotation in the other direction. Rotation of the bush 160 allows for uniform wear of the bush.

An annular cavity 133 is located in the pivot arm 130 to contain a spring 134, which works in both torsion and compression in order to maintain tension on the tension element 112 as well as to transmit an axial force to the damping arrangement provided by the bush 160 between the bore 132 in the arm 130 and the outer hub 170. A seal 166 is located beneath a rim that extends down from the outer flange 174 of the hub 170 to protect the damper bush 160 from dirt and debris. A seal 144 is also located between a base of the pivot arm 130 and the corresponding portion of the mounting base 140 in order to protect the spring 134. The seals can be contact seals made from polymeric material of can be a labyrinth seal or other seal arrangement The second embodiment of the mechanical tensioner 110 operates in the same manner as the first embodiment except that the bearing function is now carried out via bush 182 which is separate from the damping function carried out via damping bush 160.

Figure 9:
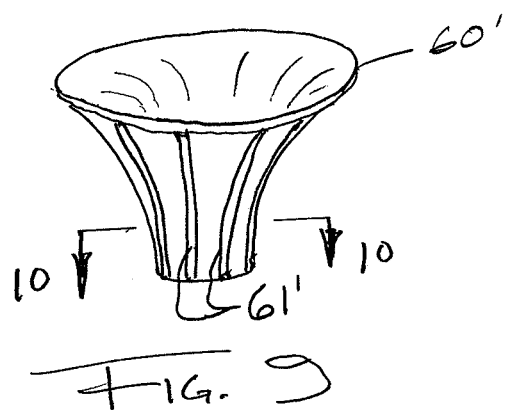
FIG. 9 is a perspective view of the bush in the form of a tractrix pseudosphere, having grooves for abraded material.
Figure 10:
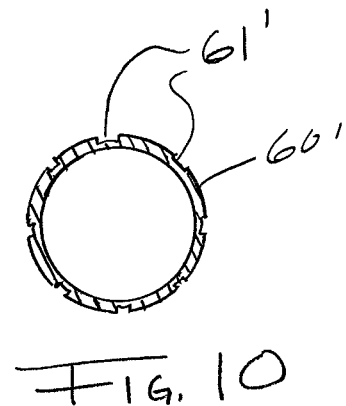
FIG. 10 is a cross-sectional view taken along line 10-10 in FIG. 9.

Referring to FIGS. 9 and 10, another embodiment of the damping bush 60' is shown, which can be used in either of the above embodiments, in which the outer surface of the bush 60' includes grooves 61' to allow abraded material to escape in order to maintain the desired bush shape and friction properties instead of allowing the abraded material to potentially alter the shape and/or rotation path of the pivot arm 30, 130 relative to the base 40, 140. While grooves 61' are illustrated on the outer surface of the bush 60', grooves could also be provided on the inner surface or both surfaces, depending upon the asymmetric damping requirements for the particular application.

While the preferred embodiment of the invention has been described in detail, those skilled in the art will recognize that some or all of the above features can be used independently from one another or in various combinations, depending upon the particular application. Accordingly, the scope of the invention should not be limited by the description of the preferred embodiments, but is as described in the claims as follow.

What is claimed is:

1. A mechanical tensioner for a tension element drive of an internal combustion engine, comprising:
    a pulley arm with a tension pulley adapted to contact the tension element drive at a distal end and a mounting bore at a proximal end;
    a mounting base that is adapted to be fixedly attached to the engine;
    an outer hub fixed to the mounting base that extends along a pivot axis having a flange, the pulley arm is pivotably mounted to the mounting base about the pivot axis, and the flange is located on a side of the pulley arm away from the mounting base to retain the pulley arm;
    a spring that functions in compression and torsion located about the pivot axis on the mounting base, with one end connected to the pulley arm and the other end attached to the mounting base, the spring provides torsion between the pulley arm and the mounting base to maintain tension on the tension element, and is compressed between the pulley arm and a surface of the mounting base to transmit an axial force between the pulley arm and the outer hub; and
    a shaped bush which functions at least as a damping element is located in a space between the outer hub and the pulley arm, an outer surface of the outer hub, the bush and at least a portion of the bore in the pulley arm have a tractrix pseudosphere shape to provide increased life and reduced wear.

2. The mechanical tensioner of claim 1, wherein the outer hub further comprises a pivot tube that extends to the mounting base, the tensioner further comprising a bush that acts as a bearing located between a second portion of the bore in the pulley arm and the pivot tube.

3. The mechanical tensioner of claim 1, wherein the shaped bush comprises inner and outer surfaces having different coefficients of friction.

4. The mechanical tensioner of claim 1, wherein the shaped bush comprises grooves located on at least one of inner and outer surfaces thereof.

5. The mechanical tensioner of claim 1, further comprising a seal located between the flange of the outer hub and the pulley arm.

6. The mechanical tensioner of claim 1, further comprising a seal located between the mounting base and the pulley arm.

7. The mechanical tensioner of claim 1, further comprising the tension pulley being located in a plane perpendicular to the pivot axis that intersects the shaped bush.

8. The mechanical tensioner of claim 1, wherein a narrow portion of the shaped bush is closest to the mounting base.

9. The mechanical tensioner of claim 1, further comprising a bush rotator that allows one-way rotation of the shaped bush connected to the flange of the outer hub facing the shaped bush.

* * * * *